US009462230B1

(12) United States Patent
Agrawal et al.

(10) Patent No.: US 9,462,230 B1
(45) Date of Patent: Oct. 4, 2016

(54) CATCH-UP VIDEO BUFFERING

(71) Applicant: Amazon Technologies, Inc., Reno, NV (US)

(72) Inventors: Amit Kumar Agrawal, Santa Clara, CA (US); Timothy Thomas Gray, Seattle, WA (US); Ambrish Tyagi, Palo Alto, CA (US)

(73) Assignee: Amazon Technologies, Seattle, WA (US)

( * ) Notice: Subject to any disclaimer, the term of this patent is extended or adjusted under 35 U.S.C. 154(b) by 37 days.

(21) Appl. No.: 14/230,047

(22) Filed: Mar. 31, 2014

(51) Int. Cl.
*H04N 7/14* (2006.01)
*H04N 7/15* (2006.01)
*H04N 5/783* (2006.01)

(52) U.S. Cl.
CPC ............. *H04N 7/155* (2013.01); *H04N 5/783* (2013.01)

(58) Field of Classification Search
None
See application file for complete search history.

(56) References Cited

U.S. PATENT DOCUMENTS

| | | | | |
|---|---|---|---|---|
| 5,854,999 | A * | 12/1998 | Hirayama | G10L 15/20 704/226 |
| 8,194,829 | B1 * | 6/2012 | Das | H04L 12/1827 379/163 |
| 8,380,999 | B1 | 2/2013 | Robison et al. | |
| 8,612,641 | B1 | 12/2013 | Bozarth et al. | |
| 8,624,725 | B1 | 1/2014 | Macgregor | |
| 8,643,680 | B2 | 2/2014 | Baldwin et al. | |
| 8,705,812 | B2 | 4/2014 | Karakotsios et al. | |
| 2005/0244138 | A1 * | 11/2005 | O'Connor | G11B 27/034 386/298 |
| 2009/0150156 | A1 * | 6/2009 | Kennewick | G06Q 3/0261 704/257 |
| 2009/0309897 | A1 * | 12/2009 | Morita | H04M 1/2535 345/629 |
| 2010/0158109 | A1 * | 6/2010 | Dahlby | H04N 7/17318 375/240.03 |
| 2010/0205667 | A1 * | 8/2010 | Anderson | G06F 3/013 726/19 |
| 2014/0320588 | A1 * | 10/2014 | Midtun | H04N 7/15 348/14.08 |
| 2016/0055859 | A1 * | 2/2016 | Finlow-Bates | G10L 21/0202 704/225 |

FOREIGN PATENT DOCUMENTS

WO 2013026487 A1 2/2013

OTHER PUBLICATIONS

Samsung Smart Pause: A Phone That Follows Your Every Move. Dec. 2, 2013. http://www.samsung.com/global/microsite/galaxys4/lifetask.html.

* cited by examiner

*Primary Examiner* — Maria El-Zoobi
(74) *Attorney, Agent, or Firm* — Seyfarth Shaw LLP; Ilan N. Barzilay; David A. Klein

(57) ABSTRACT

A system determines if someone watching a live video feed looks or moves away from a display screen, and when their attention is back on the display, provides an accelerated recap of the content that they missed. The video component of the feed may be shown as a series of selected still images or clips from the original feed, while audio and/or text captioning is output at an accelerated rate. The rate may be adaptively adjusted to maintain a consistent speed, and superfluous content may be omitted. When the recap catches up to the live feed, output returns to regular speed.

18 Claims, 10 Drawing Sheets

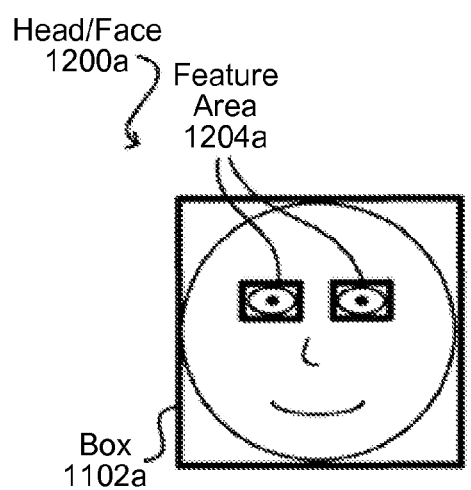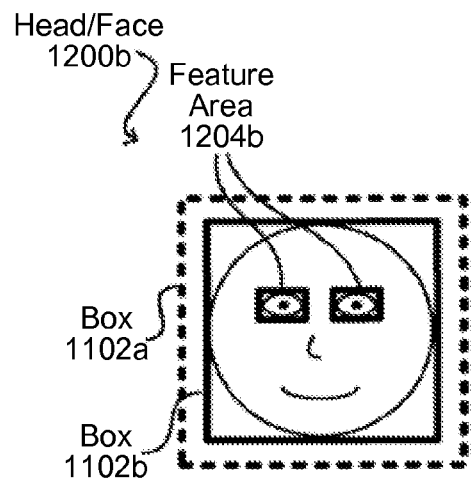

CATCH-UP VIDEO BUFFERING

BACKGROUND

Many computing devices support live feed telephone conferences and interactive online lectures. One or more of audio data, video data, and related data may be sent each way over a network, with time delays caused by processing, signal encoding, transmission, decoding, etc., becoming almost imperceptible.

BRIEF DESCRIPTION OF DRAWINGS

For a more complete understanding of the present disclosure, reference is now made to the following description taken in conjunction with the accompanying drawings.

FIGS. 12A-12B demonstrates an example of how face/head detection algorithms may estimate the relative distance to the user's head or face.

DETAILED DESCRIPTION

Figure 1:
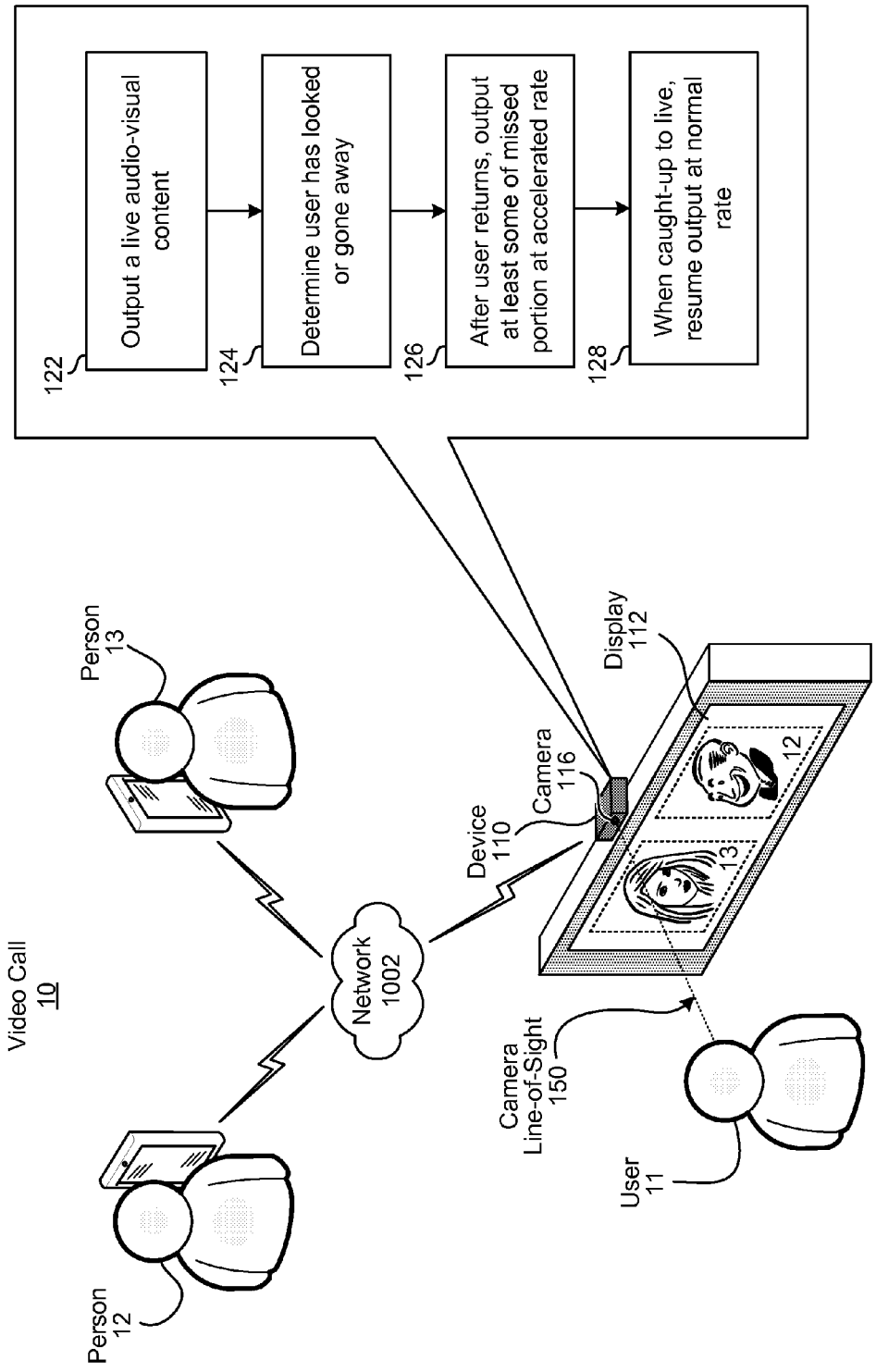
FIG. 1 demonstrates an example of a system for intelligently providing information at an accelerated rate to assist a user to catch-up with a live feed.

As an improvement on live interactive conferencing, FIG. 1 demonstrates a user 11 engaged in a three-way video call (10) with two other people 12, 13. A device 110 outputs (122) live content from one-or-more audio-visual (AV) data feeds from the other parties to a display screen 112. Live video conferencing may require a user to fixate on the display screen 112 to avoid missing content. Often times however, a user may be distracted by their surroundings, or engaged in some other activity while video conferencing. The device 112 uses one or more imaging devices (e.g., cameras) 116 to determine (124) if the user is paying attention, "consuming" the video conferencing content. Whether the user is paying attention may be determined, among other ways, based on whether he/she is determined to be looking at the display screen 112 or has looked away or moved away so that he/she is no longer in the device's line-of-sight 150. If the user 11 is determined to not be looking at the screen 112 (i.e., not consuming the content), then this content, missed content, and/or the AV data transporting the content are stored by the device 110 in a buffer. After the user 11 is determined to be again paying attention or consuming the content (e.g., again focused on the display 112), device 110 outputs (126) at least some of the missed content at an accelerated rate (e.g., a higher frame rate than the normal frame rate). When the user is caught-up to the live feed, output resumes (128) at a normal rate (e.g., the normal frame rate). As used herein, an AV data feed may include an ongoing input of data including audio and/or video data components. When the content output at the accelerated rate reaches or coincides with the live content, that content (demarcating the end of accelerated playback) may be referred to interchangeably as the most-recently received content or the most-recently stored content. The AV data may be, for example, a sequence of data elements sent and/or received over time. If the AV data is received in a stream, a stream can be thought of as a conveyor belt of data.

The device 110 may use techniques such as face tracking, gaze tracking, profile (e.g., side-of-face) tracking, pose estimation (estimation of angle at which a person is looking or head is oriented in three-dimensions) and/or three-dimensional head tracking to determine whether the user 11 is looking at the camera or cameras 116. Head orientation refers to determining an attitude of a person's head (e.g., azimuth, inclination) relative to a front of their face, so that an approximation of their field-of-view may be determined. Profile tracking is an image processing technique complementary to face tracking that looks for features such as a person's eye, ear, nose, etc., that can be seen when looking at a side of a person's head. Examples of face tracking techniques include those commonly used by digital cameras and mobile devices such as "smart" phones and tablet computers to assist with focusing on a subject's face and/or other object(s).

If the display 112 and camera 116 are not co-located as part of a same device, calibration may be performed to align the line-of-sight 150 of the camera 116 relative to the display, and/or calibration routines may be performed to detect when a user 11 is and is not looking at the display 112. Standard methods and techniques for distinguishing between a user 11 looking and not looking at the display 112 may be used for calibration. For example, if the line-of-sight 150 is aligned parallel to a surface of the display 112 (i.e., viewing from the side), calibration may include training the device 110 to recognize that a profile orientation in one direction (toward the display) corresponds to the user 11 paying attention, but profile orientations in other directions (and detection of the back of the end) correspond to the user 11 not paying attention. A calibration image or images may also be output to the display 112 so that the device 110 can apply image processing to images captured by camera 116 to determine a location and orientation (e.g., angle) of the display 112.

If the display 112 and camera 116 are co-located as part of a same device, calibration to align the line-of-sight 150 may be unnecessary, if the camera's line-of-sight 150 is fixed in a direction outward from a same surface as the display. However, calibration may still be performed for such purposes as distinguishing between faces, profiles, and the backs of heads.

The accelerated playback of video content may utilize a higher-frame rate version of content from stored AV data, stored original content from the AV data, and/or content from the AV data that is processed either before or after it is stored. For example, the device 110 may process video content so as to reduce the number of video frames (e.g., applying decimation to store only every tenth frame) so that when the processed video is played back at a normal frame-rate, the result is accelerated video. The pitch of accelerated audio may be adjusted to compensate for the increased playback rate.

However, humans are generally better at extracting information from accelerated pitch-adjusted audio and text captioning than they are at extracting information from accelerated video. In particular, information from accelerated speech can usually be understood at a faster rate than information from accelerated video. Also, while people may be accustomed to others talking fast, accelerated video may provoke an "unnatural" reaction from the viewer. Moreover, trying to follow accelerated video may divide a person's attention in such a way that they will miss accelerated spoken or textual information.

Since it is desirable to catch a user up on missed content as quickly as possible so that they are current with what is going on in the live feed, the device 110 may use video summarization techniques to select "key" frame "still" shots and/or short clips based on motion activity, color histogram changes, the appearance of a new object, the disappearance of an object previously detected in the camera's line-of-sight, or other such video summarization techniques. These frames may be identified by comparing frames of the decoded video data and/or may be identified based on an extent of changes between encoded frames (e.g., if a video compression encoding scheme that transmits changes between frames is used). The identified frames may be output as a sequence of non-moving "still" images synchronized with output of accelerated audio and/or text, thereby retaining potentially important video content without distracting the user with accelerated video.

As an alternative or in combination with still images, a sequence of video clips may be assembled, with a clip comprising multiple frames before and/or after the identified frame to provide additional context, output with the accelerated audio and/or text. Although output of the video clips may be synchronized with the output of accelerated audio and/or text, the frame rate of the individual clip may be different than the rate at which the audio/text are output. For example, the frame rate for an individual clip may be equal to or slower than the frame rate of normal video. Moreover, the frame rate for each clip may be set individually, such as if there is an irregular amount of time between key frames and/or a varying number of frames in each clip.

Video summarization may be performed at the time that processed content from the AV data is stored in the buffer (e.g., storing only the key frames or indexing which stored frames have been selected as being "key"), or may be performed by processing video content from the AV data after the content or the AV data is stored (e.g., after it is determined that the user has looked/gone away or when the accelerated content is output or after the user looks back/returns and playback is to resume).

The device 110 may skip superfluous portions of the audio during playback of buffered content. For example, silences and pauses in speech may be skipped over. Also, by applying speech processing, the device 110 may identify and skip over speech disfluencies such as spoken filler words (e.g., "you know," "like"), non-lexical utterances ("um," "er,"), and false starts (e.g., saying a word or phrase twice at the beginning of a sentence, or cutting off a new sentence mid-utterance before starting again). Segments including non-speech noises may also be skipped. Skipping such audio sections may assist in speeding playback of buffered audio.

To facilitate a user's absorption of the accelerated information, the device 110 may adaptively adjust the accelerated rate to maintain a consistent pace based on different measurements. For example, utilizing data from speech processing, a rate of accelerated audio may be adjusted to maintain a consistent rate of output in terms of spoken words-per-unit-of time (e.g., words-per-second, words-per-minute) or phonemes-per-unit-of-time. A phoneme is a basic unit of a language's phonology, which is combined with other phonemes to form meaningful units such as words or morphemes. The phoneme is the smallest contrastive linguistic unit which may bring about a change of meaning. In the alternative, if text captioning is output (e.g., closed-captioning embedded in the AV data or text from speech recognition), the rate of accelerated text may be adjusted to maintain a consistent rate in terms of words-per-unit-of time, characters-per-unit-of time, syllables-per-unit-of-time, or lines-of-text-per-unit-of time.

The device 110 may provide the user 11 a user interface to control the playback speed. For example, a virtual jog wheel or slider bar might be provided via a touch surface interface (e.g., 613 in FIG. 6), via virtual or physical buttons, via voice command (e.g., "play faster," "play slower" utilizing speech processing engine 646), etc. The device 110 may adaptively adjust the accelerated rate as described above, with the user interface increasing or decreasing that rate (e.g., increasing or decreasing the words-per-unit-of-time). The user interface may be used to adjust the accelerated playback speed without regard to whether the device 110 utilizes an adaptive rate (e.g., playing at a fixed rate with superfluous portions omitted) or a preset rate.

When the device 110 determines that the user 11 is not looking at the display 112, a message may be output to the devices of the other people connected to the live communication session (e.g., person 12, person 13) to convey to them that the user 11 is temporarily unavailable or not paying attention. Likewise, while the user 11 reviews the missed content at an accelerated rate, the device 110 may send an indication that catch-up review is in-progress.

Figure 2:
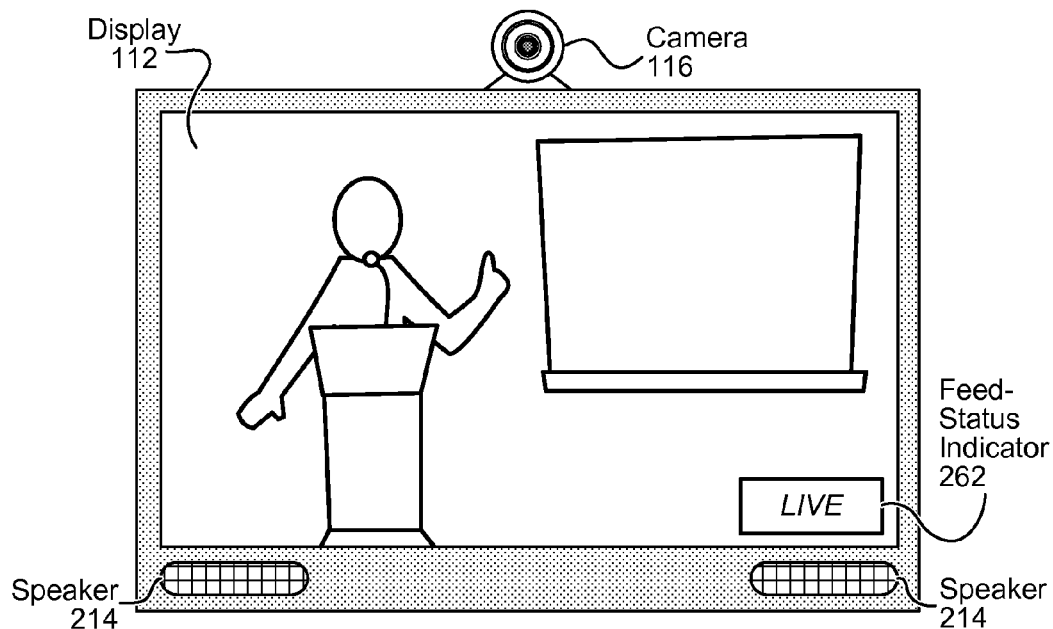
FIGS. 2 to 5 demonstrate examples of output from the system.

FIGS. 2 to 5 are examples of the output of device 110. The device 110 may use pattern recognition, rules, and heuristics to discern a paying attention "signature" indicative of a user consuming content. Initially, as shown in FIG. 2, when a paying attention signature indicates that the user 11 is consuming content (e.g., image processing determines that a face of the user 11 is oriented in the direction of the display 112 using camera 116, the user is actively interacting with a touch surface 613 of the display 112, etc.), the audio-visual data is output normally. The output may include a feed status indicator 262 (e.g., "LIVE").

Figure 3:
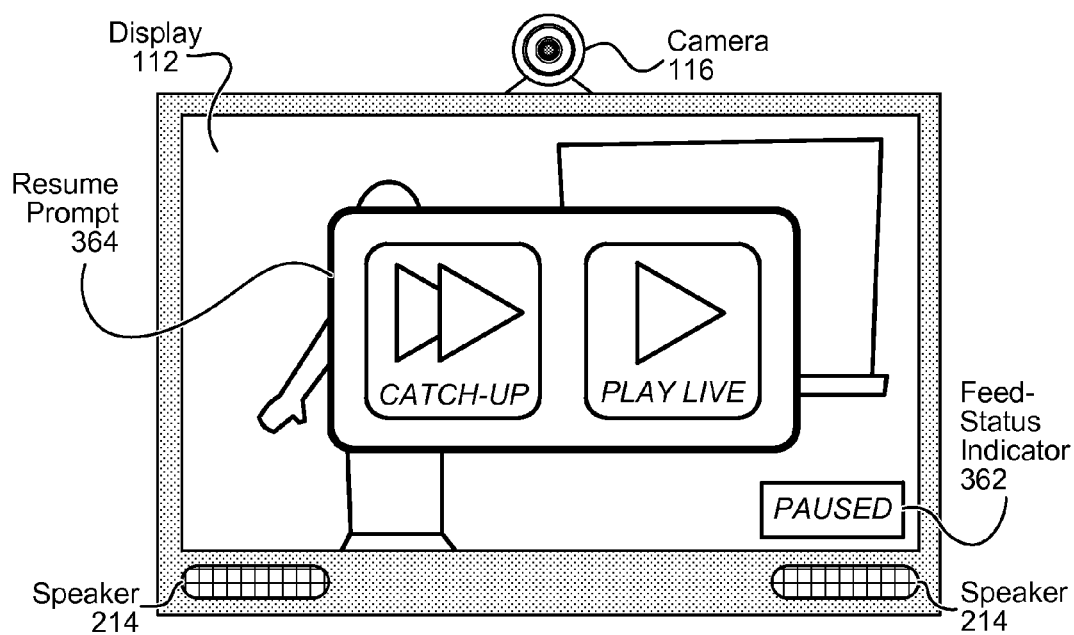

In FIG. 3, after the device 110 determines (124) that no paying attention signature is detected or a negative paying attention signature is detected (e.g., the face of the user 11 is not oriented toward the display 112 or that the user is no longer in the camera's line-of-sight 150, and is not interacting with the touch surface 613), the device 110 may pause the playback and/or output a prompt 364 offering the user 11 an opportunity to catch-up on lost content. Other indicia may be used. In the alternative, the device 110 may wait until a paying attention signature is detected (i.e., face or head detected oriented in the direction of display 112, interaction with a touch surface 613 of the display, etc.) to output the prompt 364 or other indicia. A different feed-status indicator 362 may be output (e.g., "PAUSED") to convey a change in the device's operation.

After a paying attention signature is detected (e.g., a user is determined to be back), the user 11 may be offered the choice as to whether to resume the live content as shown in FIG. 2 or view the accelerated catch-up content. The device 110 may also automatically initiate accelerated catch-up after detecting a paying attention signature (e.g., determining that the face of the user 11 is again oriented toward the display 112).

During the period where no paying attention signature is detected or a negative paying attention signature is detected (e.g., the face of the user 11 is not oriented in a direction of the display or the user is away), the device 110 may pause output of video and/or audio content from the AV data. For example, video may be paused while live playback of audio continues to be output via speaker(s) 214. Also, if the AV data includes text captioning or the device 110 performs speech recognition or other processing to generate text content, the text may be output. The portion of the display dedicated to the text may be increased to display an increased number of lines and may be user-scrollable so that when the user 11 returns the user 11 may browse the text corresponding to the buffered content to quickly assess whether they want an accelerated catch-up review.

Figure 4:
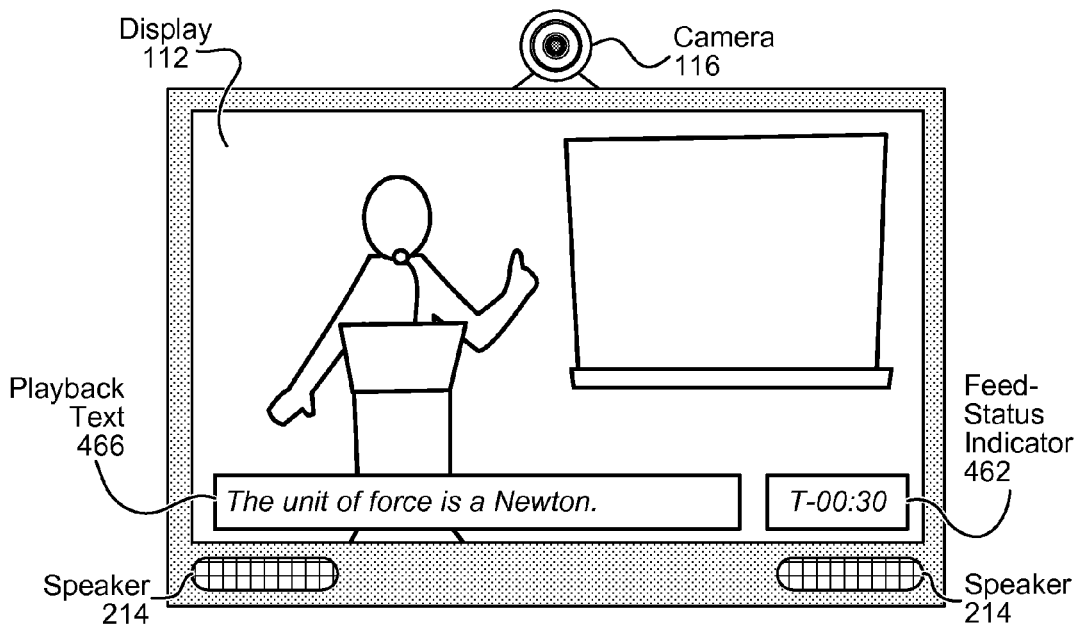

FIG. 4 illustrates an example of accelerated playback. The video portion may be accelerated video, or may be a series of still key frames or clips synchronized to the audio portion or to the text captioning. Another feed-status indicator 462, different from the initial indicator 262 and interim indicator 362, may be output to convey that catch-up review is in progress. Among other things, the device 110 may calculate approximately how much time remains until the user 11 is caught up to the live feed and include this time in the indicator 462.

Text 466 from closed captioning or speech recognition processing may be included in the output. Although a single line of text is illustrated in FIG. 4, a larger portion of the display 112 may be dedicated to text during accelerated review. The text may be overlaid on the video or key frames, or may be separate, such as "splitting the screen" to include dedicated areas for video/key frames and for text during accelerated review.

The display of accelerated playback may also include an interface (not shown) for the user to adjust the speed of playback, such as a virtual jog wheel, slider bar, or buttons, may include an indication of what external interface may be used to adjust the playback speed (e.g., which buttons to push on a remote control), or other such indicia supporting user adjustment of playback speed.

Figure 5:
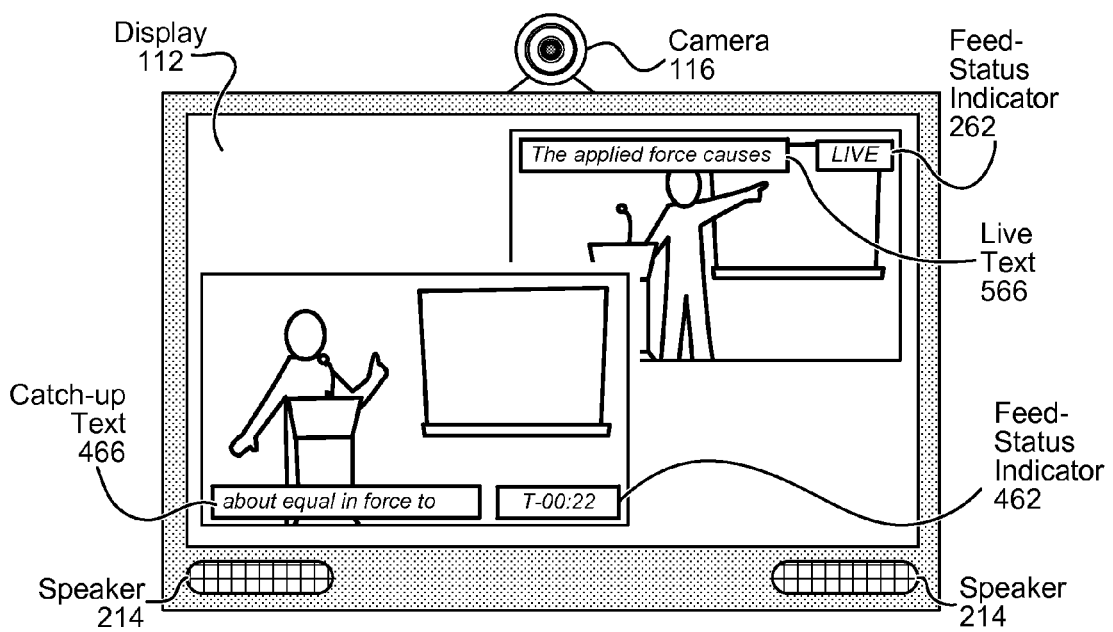

As shown in FIG. 5, the screen may be divided to provide both accelerated review and the live feed at a same time. Outputting of the audio portion for either the accelerated review or the live feed may be suspended during accelerated review. Text 566 (either from closed captioning or speech-recognition by device 110) may be added to the live feed even if text was not included when the original live feed (e.g., FIG. 2) was output. Different arrangements of the live feed and catch-up review may be selectable, such as arranging the video/images side-by-side (or above-and-below), with the corresponding text (466, 566) overlaid on the respective video/images or also arranged side-by-side (or above-and-below) adjacent to the associated video/key frames.

If a session includes components from multiple AV data feeds (such as the data from the devices of the two other persons 12, 13 on the three-way video call 10 in FIG. 1), a different color may be assigned to the video component of each data source (e.g., adding a colored box or frame around the video component, such as color coding the boxes around the heads of person 12 and person 13 as shown on the display 112 in FIG. 1). When the device 110 outputs text, these same colors may be associated with the text output so that the user 11 is able to identify the source. Other interface features may also be used to differentiate AV data sources.

Also, instead of determining that no or a negative paying attention signature is detected (e.g., applying image processing to determine that the user's eyes are oriented in a direction such that their field of view is away from the display), if a captured audio sample (utilizing an acoustic fingerprint with classifier system 648) indicates the user is snoring, if image processing from a lateral camera is no longer able to detect a profile of the user's nose or ear, etc.), a predetermined minimum threshold of inattention may be set before the device changes the feed status indicator (e.g., 262 to 362), outputs a prompt (e.g., 364), etc. For example, if the predetermined minimum threshold is five seconds, the user 11 must look away for more than five seconds before the device 110 will change operational state. Thus, if the user 11 looks back within five seconds, the state of the paying attention signature remains unchanged.

Although the device 110 may respond based on various positive and negative paying attention signatures, as well as if no paying attention signature is detected, this does not necessarily mean that the device 110 recognizes each paying attention signature as originating with a same person. That is, the device 110 may use techniques such as facial detection, profile tracking, head tracking, pose estimation, etc., to determine whether the user 11 is paying attention without using facial recognition to differentiate the facial features of a particular user from other persons. For example, if an original user moves out of the camera's line-of-sight 150, but a new or another user's face/head/profile is detected, the device 110 may not recognize the difference.

For example, if the camera is aligned with a display (for example positioned above a display as in a tablet, mobile phone, etc.) and if a face detected using the camera (e.g., at least a portion of both eyes are detected), then the user may be determined to be facing the display. But if a new user appears in the camera's line-of-side 150 and his/her face is detected, the face detection algorithm may not recognize the change. Similar outcomes can occur with profile detection and gaze detection, with the feature detection routines of the image processing techniques recognizing the direction that the original user's profile/gaze is oriented, but not recognizing that the person is different after the original user leaves and another person appears.

With information about the location of the camera relative to the display (e.g., positioned above a display, to the side of a display, etc.) the position of the head relative to the display may be determined using the position of the head relative to the camera. Techniques such as head tracking and pose estimation may be employed in a similar manner as profile detection, thus determining the position of the head relative to the display by determining the position of the head relative to the camera, and knowing the camera's position relative to the display. Even so, the face detected prior to determining that the user has looked or gone away (124) and the face detected when the device determines that the user is back may be the faces of different people.

However, depending upon design considerations such as context and the computational capabilities of the device, the device 110 may also use facial recognition or facial matching to determine that the faces and/or features that are used to determine the operational state of the paying attention signature are those of the same person. Selective application of facial recognition may also be used, such as if the device detects multiple faces in the camera's (116) field of view. If multiple faces are detected, other techniques may be used to determine which face or faces are used to determine whether to change operational state, such as tracking the orientation/pose of the face/head of the head that is closest to the camera(s) 116, or tracking orientation/pose the face/head/profile closest to the center of the center of the line-of-sight 150. The content may be adjusted according to the age and/or identity of the user for privacy, parental controls, etc. (e.g., based on facial recognition).

The missed portion of content output during accelerated review may go back to the time the user 11 was first determined to be no longer looking (124) (i.e., a negative paying attention signature). However, if the user 11 is determined to have been inattentive or gone for an amount of time exceeding a predetermined duration, the catch-up portion may be limited to an amount of time equivalent to that predetermined duration prior to when catch-up playback begins. For example, if the output of catch-up review information is automatic when the user 11 is determined to be back and the predetermined duration is thirty seconds, then catch-up review will at most include the thirty seconds prior to when the user 11 was determined to be back. The length of the predetermined duration should be set long enough to provide context for the missed portion, without being so long as to exacerbate the user's prior inattention or absence. The size of the buffer may be used to set an upper limit on the content included with catch-up review, applying first-in-first-out to overwrite buffered content if this upper time limit is exceeded.

In addition to skipping speech disfluencies, when the device 110 determines the time from which to begin review, a hanging sentence at the beginning of the duration may also be skipped. For example, if the start of the catch-up review is to be limited thirty seconds prior to the initiation of review, and the first two seconds is a cut-off of a preceding sentence as determined by speech recognition or embedded text captioning, then that cropped sentence may be skipped, with catch-up review beginning at the beginning of the next sentence.

Figure 6:
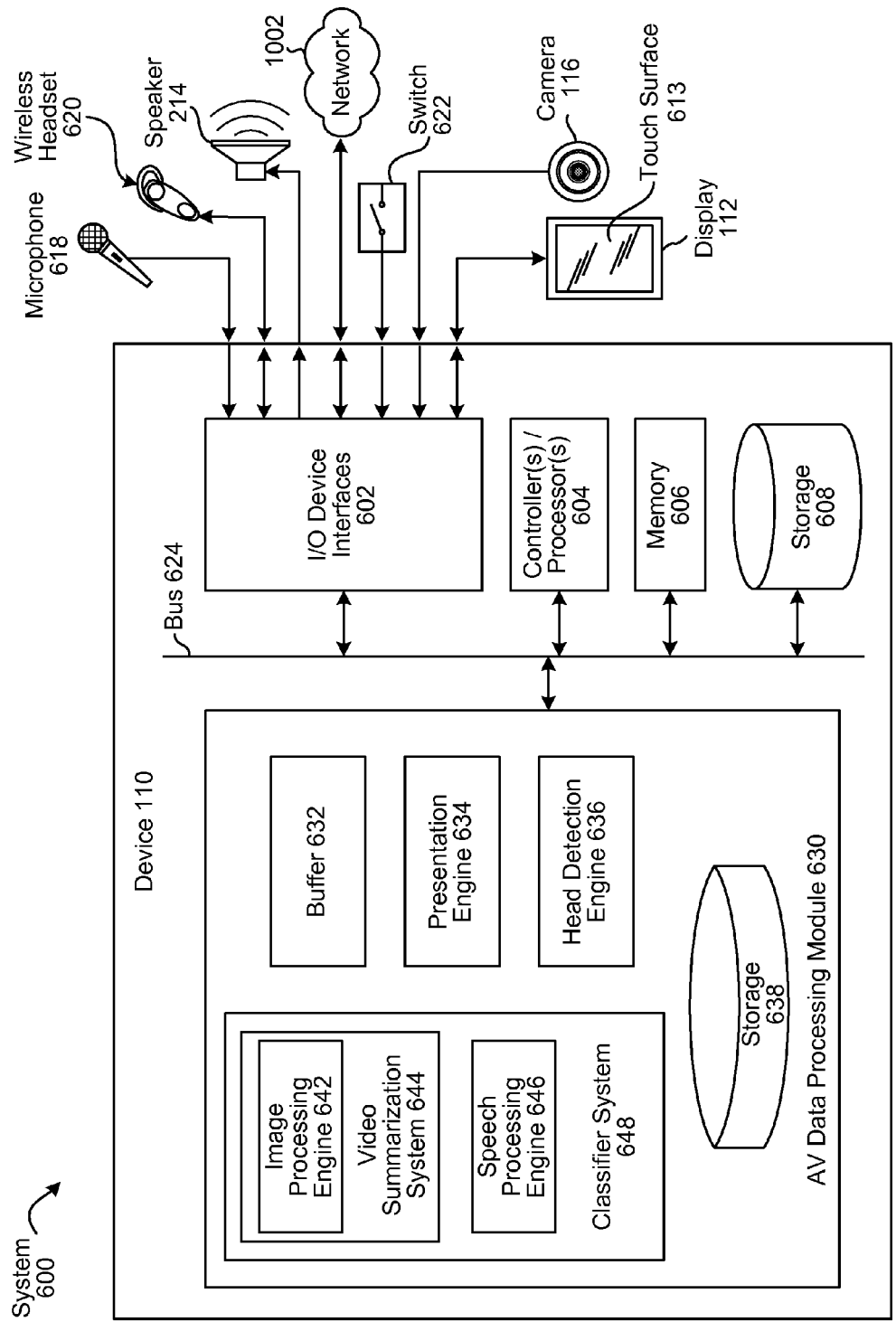
FIG. 6 is a block diagram conceptually illustrating example components of the system.

FIG. 6 is a block diagram conceptually illustrating example components of the system 600. In operation, the system 600 may include computer-readable and computer-executable instructions that may reside on the device 110, as will be discussed further below.

As illustrated in FIG. 6, the device 110 may include or be communicatively connected to an array of input/output components via input/output (I/O) device interfaces 602. For example, in addition to display 112, camera 116, and speaker 214, the system 600 may include a microphone 618, a wireless headset 620, a wired headset (e.g., 1102 in FIG. 11A), a touch-sensitive surface 613, and/or a switch 622. Some of these I/O components may be integrated into device 110 and/or may be separate.

Among other things, the microphone 618, touch-sensitive surface 613, and switch 622 may be used by the user 11 to provide a signal indicating that the device should initiate catch-up review after the user 11 is determined to be back. The microphone 618 coupled with speech processing engine 646 (discussed further below) may detect a voice command from the user as the signal. The touch-sensitive surface 613 may be integrated into the display or may be a trackpad or other surface, generating the signal in response to an interaction with an output prompt (e.g., prompt 364 in FIG. 3). And the switch 622 may be a button on a remote control or a keyboard key, the pressing of which cause the signal. Data from sensors such as the switch 622, the camera 116, the touch surface 613, the microphone 618, and microphone of headset 620 may be processed (e.g., image processing, acoustic fingerprint matching) to determine whether a "paying attention signature" exists.

The device 110 may include an address/data bus 624 for conveying data among components of the device 110. Each component within the device 110 may also be directly connected to other components in addition to (or instead of) being connected to other components across the bus 624.

The device 110 may include one or more controllers/processors 604 that may each include a central processing unit (CPU) for processing data and computer-readable instructions, and a memory 606 for storing data and instructions. The memory 606 may include volatile random access memory (RAM), non-volatile read only memory (ROM), non-volatile magnetoresistive (MRAM) and/or other types of memory. The system 600 may also include a data storage component 608, for storing data and controller/processor-executable instructions. The data storage component 608 may include one or more non-volatile storage types such as magnetic storage, optical storage, solid-state storage, etc. The device 110 may also be connected to removable or external non-volatile memory and/or storage (such as a removable memory card, memory key drive, networked storage, etc.) through the I/O device interfaces 602.

Computer instructions for operating the device 110 and its various components may be executed by the controller(s)/processor(s) 604, using the memory 606 as temporary "working" storage at runtime. The computer instructions may be stored in a non-transitory manner in non-volatile memory 606, storage 608, or an external device. Alternatively, some or all of the executable instructions may be embedded in hardware or firmware in addition to or instead of software.

The I/O device interfaces 602 may also include an interface for an external peripheral device connection such as universal serial bus (USB), FireWire, Thunderbolt or other connection protocol. The I/O device interfaces 602 may also include a connection to one or more networks 1002 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A headset 620 or 1120 may connect to the device 110 via one of these connections. Through the network 1002, the system 600 may be distributed across a networked environment, and utilize components distributed across the networked environment, as will be discussed further below with FIG. 10.

The device 110 further includes an AV data processing module 630 that interacts with input and output operations relating to live interactive data communications, and provides the catch-up review. The AV data processing module 630 may work in conjunction with an operating system and software applications execute by the controller(s)/processor (s) 604. For example, the AV data processing module 630 may be implemented as a combination of software, firmware, and/or hardware providing the interactive data communications interfaces illustrated in FIGS. 1 to 5 (e.g., as an application or in conjunction with an application). As another example, the AV data processing module 630 may be an application-independent device service (e.g., an operating system service) that detects live interactive data communications being conducted by an independent application executed by controller(s)/processor(s) 604 (e.g., by monitoring communication ports via the I/O device interfaces 602) and provides the catch-up review service without necessarily informing the independent application. Components of the AV data processing module 630 may be distributed across a networked environment, and there may be multiple occurrences of a same component across the distributed environment, as will be discussed further below in connection with FIG. 10.

The AV data processing module 630 includes buffer 632 where the content used for catch-up review is stored. The buffer 632 may be store the received AV data (e.g., compressed data as it was received), AV content embedded in the AV data (e.g., encoded or un-encoded audio and video), processed AV content (e.g., storing key frames) and/or some intermediate form of the AV data or content. The buffer 632 may be configured as first-in-first-out (FIFO) buffer, overwriting the oldest content when more storage space is needed. The buffer 632 may be a discrete component, or may be part of other memory or storage such as memory 606, storage 608, or storage 638 (which itself may be an aspect of storage 608).

Although output of live data may comprise outputting content from the AV data without having stored the output content in the buffer 632, the AV data processing module 630 may store the AV data or content extracted from the AV data in the buffer 632, and output the most recently stored data or content in the buffer 632 as "live." As used herein, the most recently received content is considered "live" if it is output with little or no latency, including if it is stored in and read from buffer 632 as it is received. Examples of latencies that may be included in the outputting of "live" content include the time necessary to decompress the AV data after if it is received and to decode AV content included in the AV data, such as if the AV data is received in a compressed and encoded format, and to store and access memory (e.g., if outputting most recently stored content from buffer).

The AV data processing module 630 also includes a presentation engine 634. The presentation engine 634 controls operation of data processing module 630, managing the buffer 632 and generation of the catch-up review (including adaptively adjusting the output rate). Among other things, the core operations of presentation engine 634 may be implemented as processor-executable instructions, by reconfigurable logic and/or as a state machine, with user interface input-elements output managed by software or firmware instructions. Such processor-executable instructions may be stored in storage 638 of the AV data processing module 630, a nonvolatile portion of memory 606, or in storage 608.

The presentation engine 634 may use the classifier system 648 (e.g., to detect snoring) and the head detection engine 636 (which monitors the camera(s) 116 and performs face detection, face tracking, gaze tracking, profile tracking, pose estimation, and/or three-dimensional head tracking) to determine whether a positive, negative, or no paying attention signature is detected. Face detection engine 636 may be dedicated to the AV data processing module 630, or may be a functionality shared with other software on the device 110. Among other things, the head detection engine 636 may be a functionality of the image processing engine 642 of the classifier system. The head detection engine 636 may provide one or more calibration routines to configure the image processing distinction between when a positive and a negative paying attention signature.

A video summarization system 644 includes an image processing engine 642 and selects key frames for the accelerated catch-up review. Among other techniques, the video summarization system may identify and select key frames and video clips based on relative maxima of motion activity in comparison to a range of antecedent and succedent video frames, motion activity exceeding a predetermined threshold, relative maxima of color histogram changes in comparison to a range of antecedent and succedent video frames, color histogram changes exceeding another predetermined threshold, the appearance of a new object in the frame, the disappearance of an existing object (i.e., failure to detect an object that was previously detected), or any other change detection method. As used above, the range of antecedent and succedent video frames represent a group of video frames from which activity may be analyzed for purposes of detecting key frames for inclusion in accelerated video playback. Techniques such as sharp boundary detection may be used to determine when a new object appears in a frame.

Whether video clips or stills are selected based on the key frames may be based on, among other things, specified settings (e.g., user preferences; a set number of frames before and/or after a key frame), the frequency of key frames, the rate/speed of accelerated playback, the separation between key frames, the number of frames in succession that exceed one or more of the predetermined threshold, and/or the number of frames required to show the appearance or disappearance (i.e., failure to detect that which was previously detected) of an object from the field of view. The video summarization used for a single accelerated playback session may mix both stills and video clips, or exclusively use one or the other.

The selection of key frame stills and clips may be performed by the video summarization system 644 when content from the AV data is stored in the buffer or afterwards. For example, if video summarization is performed before storage, the key frame stills and/or clips may be stored in the buffer 632 instead of the video content, thereby saving storage space. As another example, regardless of when summarization is performed, the video summarization system 644 may generate an index corresponding to which frames of video content stored in the buffer 632 have been selected as key frame stills and/or clips.

The image processing engine 642 may perform image recognition on the stored or live video content to identify image features, such as identifying the presence, first appearance and departure/disappearance of objects. Distinctive video transitions may be identified, such as when there is a change in camera angle or scene results in an abrupt change in frame-to-frame content, as well as perceptual difference between frames. These frame-to-frame transitions and differences may also be identified by monitoring the encoded AV data as received by the I/O device interfaces 602, as well as by monitoring the AV data-decode process.

The AV data processing module 630 may also include a speech processing engine 646 to process received and/or buffered audio data using models stored in storage 638. Speech processing may include automatic speech recognition and natural language processing. Automatic speech recognition (ASR) comprises converting speech into an interpreted result such as text, whereas natural language processing (NLP) comprises determining the meaning of that interpreted result. In addition, the classifier system may also perform ASR and/or NLP to facilitate recognition of speech disfluencies such as spoken filler words, non-lexical utterances, and false starts, and to determine whether words form a complete or partial sentence.

The image processing engine 642, the video summarization system 644, and the speech processing engine 648 may be components of a classifier system 648. The classifier system 648 may use models and/or machine-learning techniques to identify video and audio content. In addition to speech and image processing, the classifier system 648 may perform noise recognition on the stored or live AV data, using acoustic fingerprints stored in storage 638. The classifier system 648 may be, for example, a Support Vector Machine (SVM), although other machine learning techniques might be used instead of or to augment SVM. The classifier system 648 may utilize Hidden Markov Models (HMMs), Gaussian Mixture Models (GMMs), Mel-Frequency Cepstrum Coefficients (MFCCs), etc. The classifier system 648 may also include or provide image processing support to the head detection engine 636.

The speech processing engine 646 of the classifier system 648 transcribes audio data into interpreted data such as text representing the words of the speech contained in the audio content of the stored or live AV data. The speech processing engine 646 may also be used, for example, to compare the audio content with models for sounds (e.g., speech units or phonemes) and sequences of sounds to identify words that match the sequence of sounds spoken in the utterance of the audio data. This text and/or phoneme data may then be used by the presentation engine 634 for various purposes including text captioning and adaptively adjusting a rate of accelerated output during catch-up review. The text data may be generated before or after the AV data or AV data content is stored in the buffer 632, and may be indexed to buffer content.

If closed captioning is embedded in the received AV data, it may also be stored in the buffer 632 and used instead of text and phoneme data generated by the classifier system 648. Although closed captioning may not include phoneme data, components of the classifier system 648 may be used to calculate the number of syllables in the closed captioning data, with syllables-per-second being used to adaptively adjust the rate of accelerate playback.

Detecting "command" words, phrases, or sounds may be another function of the speech processing engine 646, such as if the user 11 uses voice commands to control whether accelerated catch-up review is output, or whether to increase or decreased the speed of the accelerated playback. The classifier system 648 may detect command words by comparing input from the microphone 618 or other audio input component to "command" patterns stored in storage 638. These command words, phrases, or sounds may be generic to the device 110, such "attention computer" or the like.

Multiple devices 110 may be employed in a single system 600. In such a multi-device system, each of the devices 110 may include different components for performing different aspects of the accelerated catch-up review process. The multiple devices may include overlapping functionality. The components of device 110 as illustrated in FIG. 6 are an example, and these may be included in a stand-alone device or may be included, in whole or in part, as components of a larger device or system.

Figure 7:
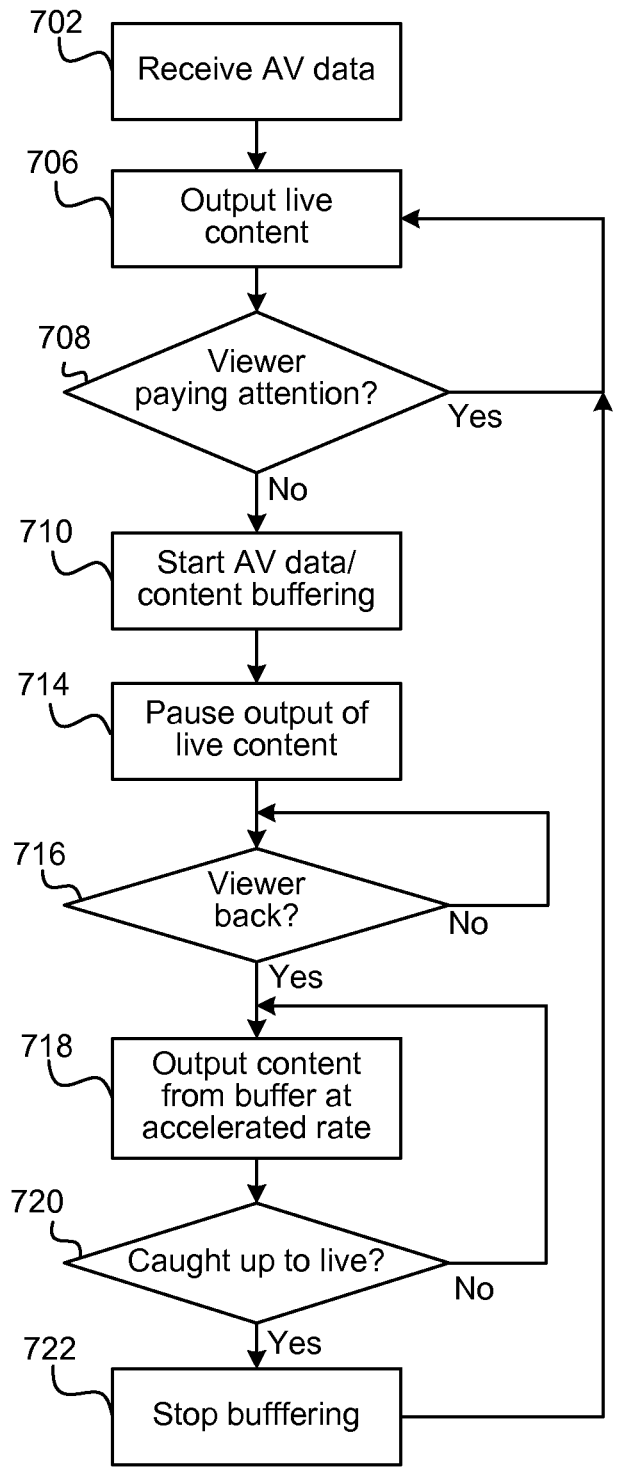
FIGS. 7 and 8 illustrate examples of algorithms for buffering content from the feed and providing the catch-up information.
Figure 8:
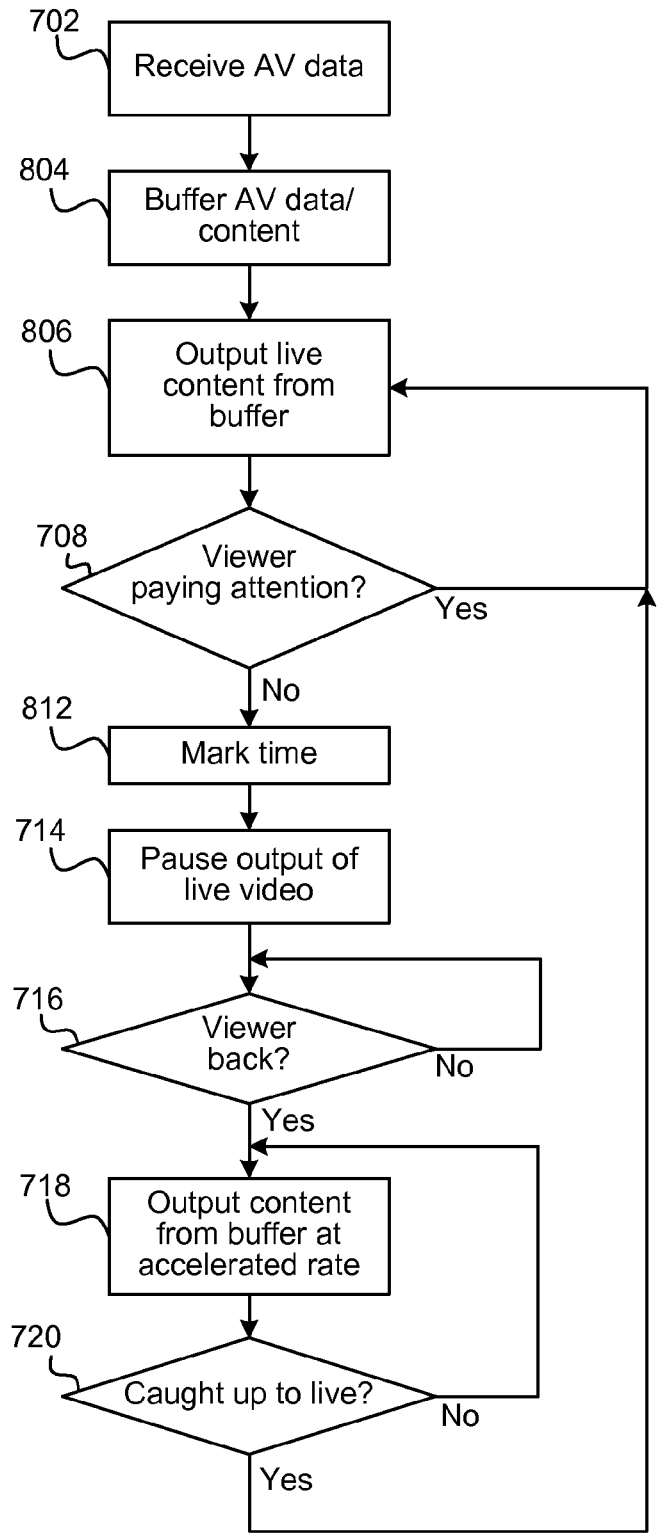

FIGS. 7 and 8 illustrate examples of algorithms that may be performed by the presentation engine 634 to control operations. The primary difference between FIGS. 7 and 8 is how the buffer 632 is utilized.

In FIG. 7, the process begins with the device 110 receiving (702) AV data. Initially, live content from the live AV data is output (706). The presentation engine 634, in conjunction with the head detection engine 636 and/or classifier system 648, determines 708 whether a positive, negative, or no paying attention signatures is detected (e.g., based on an approximate calculation of the user's field of view relative to the display 112). A predetermined delay may be provided before the user is regarded as not paying attention to compensate for brief glances by the user and false detections by the head detection engine 636.

If the user is determined to be paying attention (708 "Yes"), then the presentation engine 634 continues to output (706) the live content from the AV data (e.g., as in FIG. 2). If the user 11 is determined to not be paying attention (708 "No"), the presentation engine 634 activates buffering (710) of the AV data and/or content from the AV data in buffer 632. As discussed above, the presentation engine 634 may also modify the output such as pausing (714) or suspending live video output, suspending live audio output, outputting a prompt (e.g., 364), changing the feed status indicator (e.g., 262 to 362), and generating output to one or more other network-connected devices (e.g., the devices of persons 12, 13 in FIG. 1) conveying that the user 11 is away (or not paying attention, such as if in an academic setting).

After the head detection engine 636 indicates that the user is again paying attention (716 "Yes"), the presentation engine 634 outputs (718) the catch-up review information at the accelerated rate. As noted above, some or all of the screen changes such as those in FIG. 3 may not be output until the user returns (after 716 "Yes", instead of after 708 "No").

As discussed above, the presentation engine 634 may automatically initiate outputting (718) at the accelerated rate when the user's attention returns (716 "Yes"), or wait for a signal from the user to initiate the accelerated catch-up review (718). If the signal is not received by the presentation engine 634 within a predetermined time after the user's attention returns (716 "Yes"), the presentation engine 634 may skip back-up review (e.g., skip 718, 720) and instead continue or return to output the live content from the AV data (706).

When the accelerated catch-up review reaches the most-recently received content (720 "Yes"), regular live playback resumes (706) and the presentation engine 634 may suspend 722 buffering of the content/AV data (e.g., altogether or only for the purpose of an active catch-up review session).

In comparison, in FIG. 8, content from the received AV data is continually stored (804) in buffer 632. The presentation engine 634 may output the most-recently received content as stored in the buffer as the live content (806), or it may output the live content independent of buffering (i.e., the same as output 706 in FIG. 7). After the head detection engine 636 determines that the user 11 is not paying attention (708 "No"), the presentation engine 634 makes a record (812) of the time and/or contemporaneous location of content in the buffer 632. After the user 11 returns to paying attention (716) "Yes," and the accelerated playback catches up to live (720 "Yes"), live playback resumes (e.g., 806).

Although determining whether a user 11 is or is not paying attention has primarily been discussed based on using a camera or cameras 116 to determine head orientation (e.g., discussions of 124, 636, 708, 716), other techniques may be used, either on their own or in combination with determining head orientation. As already mentioned, an example is to use an acoustic fingerprint with the classifier system 648 to detect snoring. As another example, if there is a keyboard, pointing device, or other user interface associated with display 112 (outputting live content from the live AV data), these user interfaces may be monitored to determine whether the user 11 is actively interacting with the system (and in particular with the active call rather than with a different application), or interactions are occurring in less than some threshold time (beyond which, inactivity is interpreted as meaning the user is not paying attention). The user may be periodically prompted to interact with the system to determine that they are still paying attention. Also, if speech utterances from the user to other call participants are detected, the user 11 may be presumed to be paying attention. Acoustic localization techniques using multiple microphones 618 may be used to determine where the captured utterances originated, with utterance captured within some threshold distance and/or range of angles being regarded as having originated from the user 11, even if the user 11 is not detected in the camera's line-of-sight 150.

Figure 9:
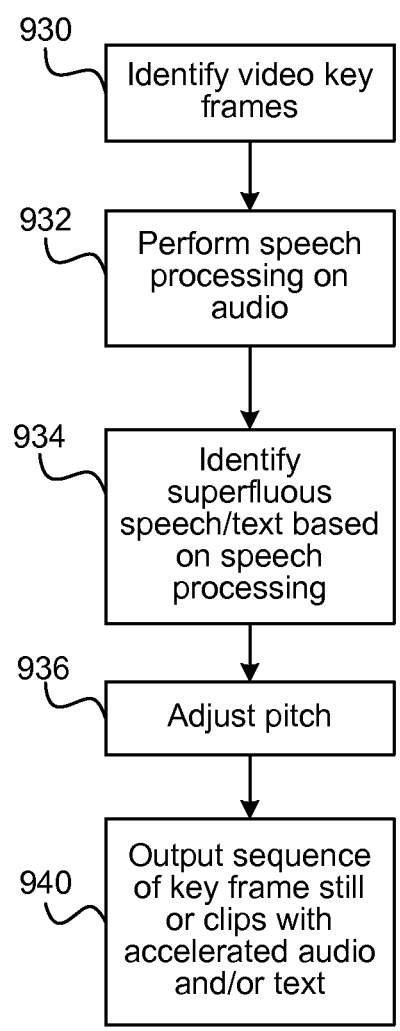
FIG. 9 illustrates an example of an algorithm for providing the information at the accelerated rate.

FIG. 9 illustrates an example of a subroutine that may be included in the outputting (718) of the catch-up review at the accelerated rate. As previously above, the accelerated rate may be fixed or adaptive (e.g., adapted based on the processed speech content, text of the processed speech content, or closed-captioning provided in the received AV data), and be adjusted by the user 11 via a user interface.

Initially, the video summarization system 644 selects (930) key frames from the video component, identifying individual "still" frames or plural frames as "clips," and the classifier system 648 performs speech processing (932) on the audio component.

The classifier system 648 identifies (934) superfluous speech content based on the speech processing. If the accelerated playback includes audio, the pitch of the accelerated audio is adjusted (936) so that the frequency range of the accelerated audio is similar to that of the original audio content. The presentation engine 634 outputs (940) the sequence of key frame stills and/or clips synced to the accelerated audio and/or text while omitting the portions of speech content identified (934) as superfluous.

The rate of the accelerated output may be adaptively adjusted to maintain a consistent accelerated rate. A brief gap, pause, or silence may be left or inserted into the accelerated audio and/or output text between identified sentences to assist with comprehension. Other combinations of features may be used, such as omitting the identification (934) and removal of superfluous speech, relying on the accelerated speed of playback for the accelerated rate, or including the identification (934) and removal of superfluous speech by playing back at a normal rate, with the "accelerated" aspect being due to the removal of the superfluous content. In each case, however, the key frame stills and/or clips are sequenced to align in time with the outputting of corresponding audio and/or text so that the speech content relates to the video content. If clips are used, the time index of at least one frame of the clip may correspond to the time index of output speech content that occurs while the frame is displayed (e.g., the output rate of frames of the clip and output speech content may be different, such that the lips of a speaker in a clip might not sync with accelerated speech content, but the clip is related in time with the output speech content.

The concepts disclosed herein may be applied within a number of different devices and computer systems, including, for example, smart phones, tablet computers, general-purpose computing systems, multimedia set-top boxes, smart televisions, server-client computing systems, mainframe computing systems, video telephone computing systems, laptop computers, wearable computing devices (watches, glasses, etc.), other mobile devices, etc.

Figure 10:
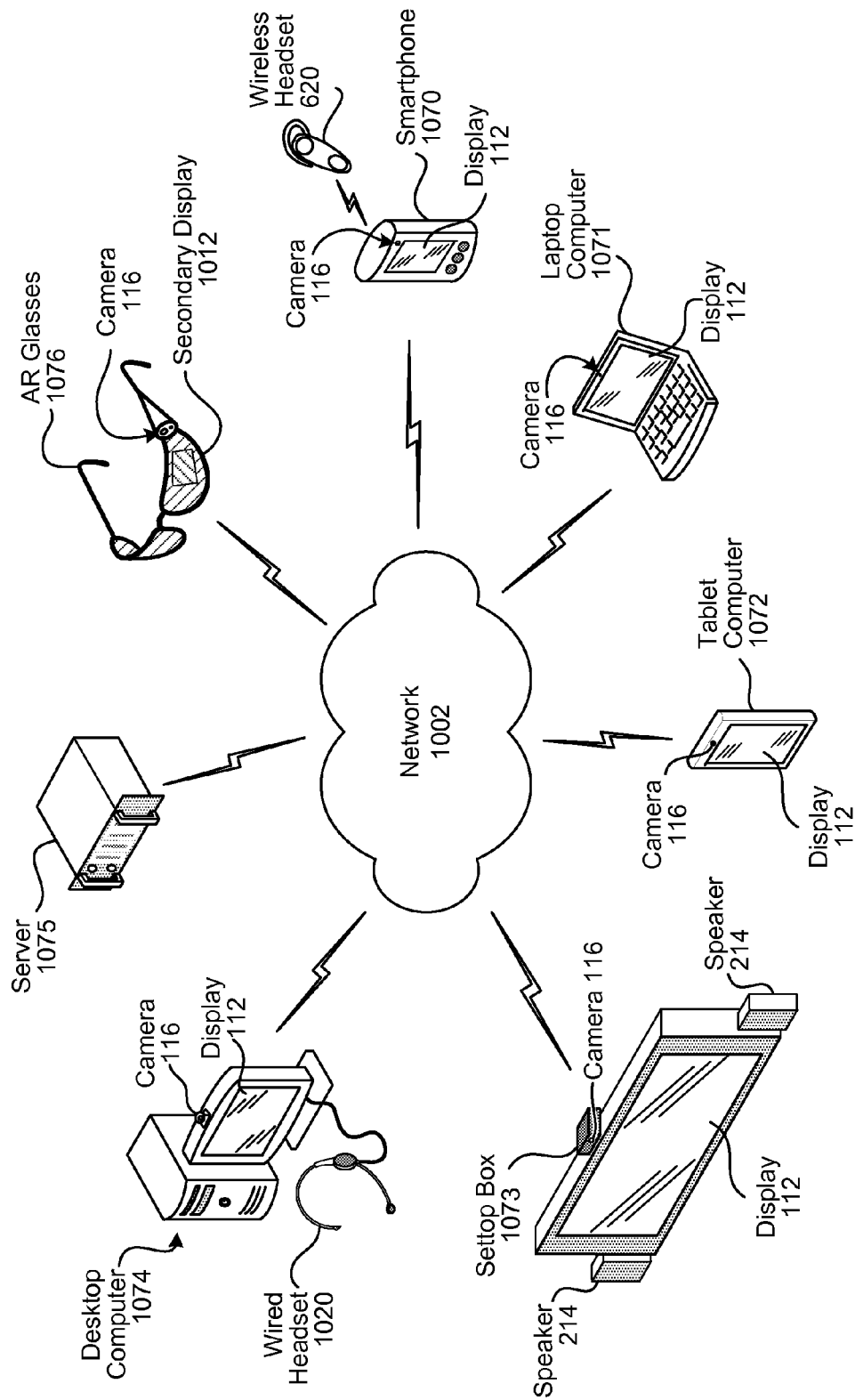
FIG. 10 illustrates an example of a computer network for use with the system.

As illustrated in FIG. 10, multiple devices (1070 to 1076) may contain components of the device 110 and system 600, and may be connected over a network 1002. Network 1002 may include a local or private network or may include a wide network such as the internet. Devices may be connected to the network 1002 through either wired or wireless connections. For example, a smartphone 1070, a notebook computer 1071, and a tablet computer 1072 may be connected to the network 1002 through a wireless service provider, such a WiFi or cellular network connection or the like. Other devices, such as set-top box 1072, a desktop computer 1074, and a server 1075 may connect to the network 1002 through a wired connection. Networked devices may capture and output audio and video through a number of audio input and output devices such as headsets 620, 1120, speakers 614, and display 112. These audio capture and output devices may be connected to networked devices either through a wired or wireless connection. Networked devices may also include embedded audio input devices and output devices, such the inclusion of other I/O components illustrated in FIG. 6.

Instead of using a camera to watch the user 11 to determine whether they are paying attention, a head-mounted camera may be used to determine where the user 11 is looking to determine whether they are paying attention. For example, if the user 11 is wearing augmented reality (AR) glasses 1076 including a camera 116, the camera 116 may be used to determine whether the user is viewing the display 112 (i.e., paying attention). Specifically, the AV data processing module 630 may process one or more images captured by camera 116 to determine whether the user 11 is looking in the general direction of the display 112. If video content output via the display 112 is not captured by the camera 116, the user may be deemed to not be paying attention, and vice-versa. This may also detect if the user is looking at something other the AV content on the display 112 (e.g., reading the paper, playing a game). In addition, when accelerated catch-up review is provided, it may be sent to a secondary display 1012 built into the AR glasses 1076 rather than the display 112. If the AR glasses 1076 support audio output, accelerated audio during catch-up may also be sent to the glasses.

Use of AR glasses 1076 enables providing customized catch-up content to each pair of glasses. When multiple users are watching the same video content on the display 112, video content may be output continuously and uninterrupted at a normal rate to a shared primary display 112, even when a user is determined not to be paying attention. That user 11 may then be provided a personalized accelerated catch-up review via their personal secondary display 1012 while other users continue to watch the live feed on the shared primary display. In addition, by using AR glasses 1076, accelerated catch up review may be provided for live in-person events (e.g., omitting display 112) that are captured by a camera (e.g., closed-circuit television capturing a live event that user 11 is attending, with the captured AV content being stored in buffer 632 as discussed above with FIGS. 7 and 8).

A similar technique may be used for audio if the user 11 is wearing a microphone (e.g., a microphone of wireless headset 620, AR glasses 1076, etc.). If audio content output via the speakers 214 is captured by the microphone, the user 11 may be deemed as paying attention. Likewise, if the captured audio fades below a threshold level, the user 11 may be deemed as not paying attention, as the user is presumed to have turned away or moved away from the device outputting the AV content.

The various disclosed techniques for determining whether a user is or is not paying attention may be used individually or in combination. A different technique may be used to determine whether a user is paying attention than is to determine that they were not. For example, a loss of head detection may be used to determine that the user is not paying attention, but a press of a button or key may be used to determine that they are ready to pay attention again (or are paying attention again).

In certain system configurations, one device may perform data capture and display, while another device performs AV data processing. For example, referring back to FIG. 1, the server 1075 may receive AV data feeds from the devices of person 12 and person 13, relaying their AV data to a device including the display 112, speaker(s) 214, camera 116, etc., and relay the content from I/O components at the user's (11) location back to the devices of these other persons 12, 13. But while the I/O components may be at the user's (11)

location, the AV data processing module 630 may be on the server 1075, reducing the computational load on user's downstream device.

Figure 11A:
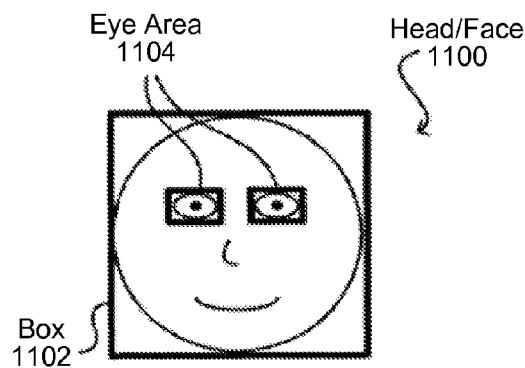
FIGS. 11A-11F demonstrates operation of algorithms that may be used to identify a location and orientation of a user's head or face.

Various approaches can be utilized for locating one or more desired features of a user's face or head to determine aspects of the image processing useful for determining relative orientation. For example, an image of the user 11 captured by the camera 116 may be analyzed to determine the approximate location and size of a user's head or face. FIG. 11A illustrates an example wherein the approximate position and area of a user's head or face 1100 is determined and a virtual "box" 1102 is placed around the face as an indication of position using one of a plurality of image analysis algorithms for making such a determination. Using such an algorithm, a virtual "box" is placed around a user's face and the position and/or size of this box is continually updated and monitored in order to monitor relative user position. Similar algorithms may also be used to determine an approximate location and area 1104 of each of the user's eyes (or in some cases the eyes in tandem). By determining the location of the user's eyes as well, advantages may be obtained as it becomes more likely that the image determined to be the user's head actually includes the user's head, and it can be determined that the user is facing the device. Examples of other features that may be located include a user's nose, mouth, and/or ear(s). Further, the relative movement of the user's eyes may be easier to detect than the overall movement of the user's head when performing motions such as nodding or shaking the head back and forth. Monitoring box (1102) size also helps to provide distance information (as further described below with FIGS. 12A-B) as well as directional information, which can be helpful when generating a three-dimensional model for modifying image information based on relative user position.

By determining a position of the display 112 relative to identified features 1104 of the user's face 1102, the system 600 may determine an alignment of the identified feature or features in comparison to the position of the display. The position of the display 112 relative to the camera 116 may be determined, if not fixed, by (for example) outputting a test image to the display 112, and having the camera 116 capture the test image as output by the display 112, determining the relative positions/orientations of the display 112 and the camera 116 based on the position and orientation of the test image as captured by the camera 116.

Figure 11B:
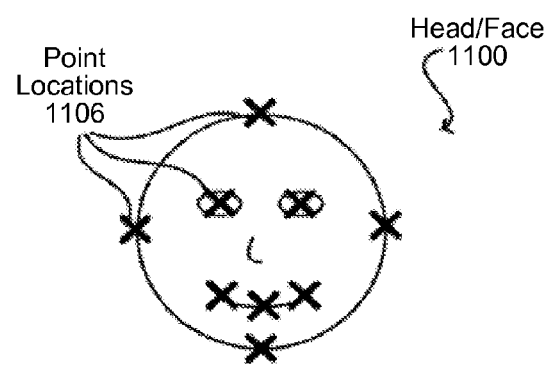

Various other algorithms can be used to determine the location of features on a user's face. For example, FIG. 11B illustrates an example wherein various features on a user's face are identified and assigned a point location 1106 in the image. The system 600 thus can detect various aspects of user features and can determine more subtle changes in orientation. Such an approach provides advantages over the general approach of FIG. 11A in certain situations, as various other features can be determined, in case the user's eyes cannot be seen due to glasses, hair, etc.

Figure 11C:
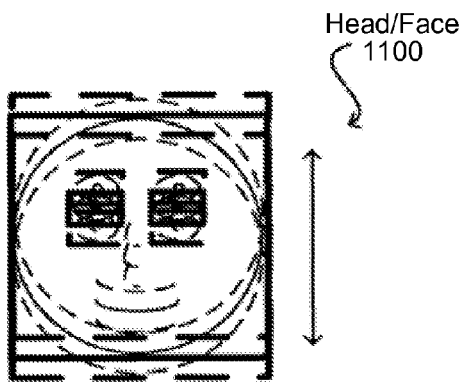
Figure 11D:
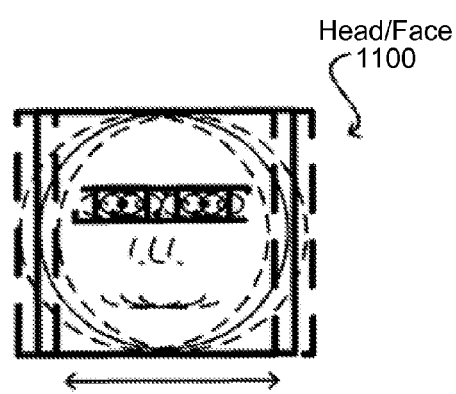
Figure 11E:
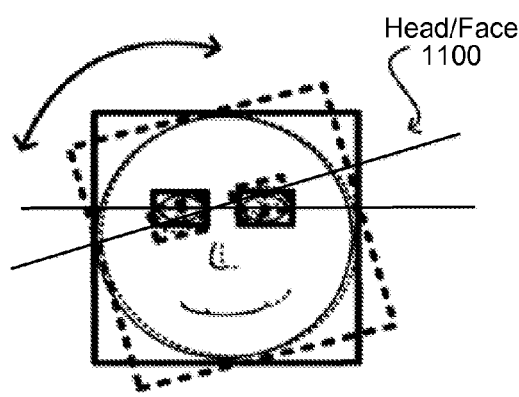
Figure 11F:
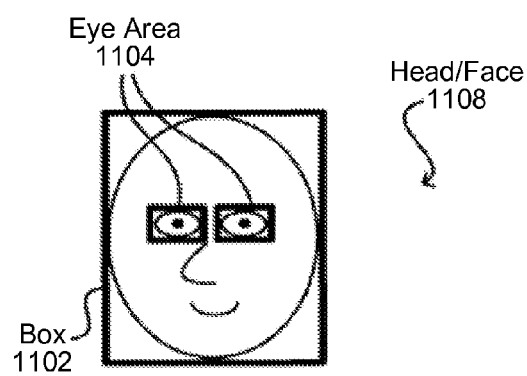

Once the positions of facial features of a user are identified, relative motion between the user 11 and the device 110 can be detected and utilized as input. For example, FIG. 11C illustrates an example where the user's head 1100 is moving up and down with respect to the viewable area of the imaging element. This could be the result of the user moving his or her head, or the user moving the device up and down, etc. FIG. 11D illustrates a similar example wherein the user is moving right to left relative to the device, through movement of the user, the device, or both. As can be seen, each movement can be tracked as a vertical or horizontal movement, respectively, and each can be treated differently as an input to modify a displayed image. As should be understood, such a process also may detect diagonal or other such movements. FIG. 11E further illustrates an example wherein the user 11 tilts the device 110 and/or the user's head, and the relative change in eye position is detected as a rotation. In some systems, a "line" that corresponds to the relative position of the eyes can be monitored, and a shift in angle of this line can be compared to an angle threshold to determine when the rotation should be interpreted as input. FIG. 11F illustrates another advantage of using an approach such as that described with respect to FIG. 11B to determine the position of various features on a user's face. In this exaggerated example, it can be seen that the features of a second user's head 1108 have a different relative position and separation. Thus, the device 110 also can not only determine positions of features for a user, but can distinguish between different users.

FIGS. 12A and 12B illustrate an example approach that can be used to determine variations in relative distance between the user 11 and the device 110 that may be used by system 600. As in FIG. 12A, the approximate position and area of a user's head or face 1200a is determined and a virtual "box" 1102a is placed around the face or head 1200a at an initial distance as an indication of distance using one of a plurality of image analysis algorithms for making such a determination. If the user 11 is known, the size of the user's head may be stored such that an actual distance to the user 11 can be calculated based at least in part upon the size of the box 1102a. If the user is not known, the distance can be estimated or determined using other factors, such as stereoscopic imaging or based on an average size of a human head. Determinations may be relative with respect to an initial box size 1102a when the actual distance cannot be determined.

As the distance between the user 11 and the device 110 changes, the size of the virtual box will change as well. For example, in FIG. 12B the distance between the user 11 and the device 110 has increased, such that the user's head 1200b appears smaller in the captured image information. Accordingly, the size of the virtual box 1102b for the adjusted size of the user's head is smaller than the original box 1102a for the initial distance. By monitoring adjustments in the size of the box or another measure of the user's head and/or other such features (e.g., feature area boxes 1204a, 1204b), the device 110 may determine an approximate distance and/or change in distance to the user 11.

The device 110 may determine and track an approximate area or region of interest corresponding to the user's eyes (e.g., feature area boxes 1204a, 1204b), or other such features, in the captured images such that an algorithm of the device 110 may reduce the quantity of the image data analyzed to those specific regions, which can significantly reduce the amount of processing needed for images, particularly for high resolution, full color images.

Other approaches may be used to track the user 11. For example, thermal imaging, acoustic localization, or other such approaches may be used by themselves or in combination with camera-based tracking techniques (e.g., FIGS. 11A-11F and 12A-12B) to determine and track the position of at least some physical aspect of the user 11.

If two or more imaging sensors are used (e.g., dual cameras 116), stereoscopic imaging may be used to determine the location of the user 11. In many situations, the position of an imaging sensor (e.g., camera(s) 116) will be offset from the eye of the user 11, such that some image translation and viewing angle adjustments may be needed to ensure the consistency of both the image captured for sharing (e.g., sending to person 12 and person 13 in the video call 10 in FIG. 1) and to improve operation of the algorithms used to determine the location and orientation of a user's head or face.

As discussed, the device 110 may utilize the user's gaze direction as an input as well as the relative position. In addition to being useful for determining whether the user is paying attention (e.g., 708, 716 in FIGS. 7 and 8), this data may be used to add functionality to the displayed image, particularly if the display 112 is large. For example, if the display 112 is a large screen television display then the user 11 might only be able to focus on a portion of the screen at any time. Thus, the portion at which the user 11 is looking may be adaptively configured to provide additional functionality, such as the positioning of live text (566) or catch-up text 466 relative to displayed images based on where the user 11 is looking. Displayed text may be scaled larger or smaller based on the area the user 11 is approximated as viewing as well. If there are multiple persons around the television and only one of the viewers (e.g., user 11) is actively consuming content, the device 110 may tailor content (e.g., add overlays, choose playback settings) based on where that view is looking and/or based on the identity of the viewer if known (e.g., based on that user's stored preferences).

An audio-visual (AV) data feed may comprise audio content and video content, as well as closed captioning and other metadata. The various content types may be synchronized within the AV data. As used herein, a single AV data feed may comprise multiple actual feeds, such as audio content received from a first source on a first feed and video content received from a second source on a second feed, separate from the first feed. Even if the audio and video are not in sync upon arrival at the device 110, they may nonetheless compose a single AV data feed. If this different content from different sources does arrive out-of-sync at device 110, the content may synchronized by the device 110 upon receipt.

The examples included in the present disclosure are meant to be illustrative. They were chosen to explain the principles and application of catch-up video buffering and are not intended to be exhaustive or to limit the disclosure. Many modifications and variations on the disclosed examples may be apparent to those of skill in the art. Persons having ordinary skill in the field of computers, video telephony, video conferencing, image processing, speech processing, object detection and tracking, video summarization, digital imaging and/or content conversion, should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. In addition, one or more engines of AV data processing module 630 may be implemented as firmware or as a state machine in hardware. For example, the logic illustrated in FIGS. 7 and 8 performed by the presentation engine 634 may be implemented in whole or in part as an application specific integrated circuit (ASIC), a field programmable gate array (FPGA), etc. In addition, a digital signal processor (DSP) may be used for some processing performed by the image processing engine 642, video summarization system 644, speech processing engine 646, and other aspects of the classifier system 648.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
receiving audio-visual (AV) data as part of a video conference call;
detecting a face of a participant of the video conference call using an imaging device associated with a device of the participant;
determining that the participant's face is oriented in a direction toward a display associated with the device of the participant by applying image processing to a first image captured by a camera;
outputting live content from the video conference call to the display at substantially a same time as the first content is received based on determining that the participant's face is oriented in the direction toward the display;
determining, at a first time, that the participant is no longer observing the conference call based on image processing of a second image captured by the camera failing to detect that the participant is facing the display;
determining, at a second time, that the participant is again observing the conference call by determining that the participant is facing the display, based on image processing of a third image captured by the camera, wherein the second time is after the first time;
storing content from the AV data after the first time;
performing speech-recognition processing on an audio portion of the AV data;
identifying one or more sections of the audio portion of the AV data, the one or more sections comprising one or more of: silences, pauses, spoken filler words, non-lexical utterances, and false starts;
outputting stored content to the display, wherein the outputting occurs after the second time and wherein the stored content is output at an accelerated rate until the stored content reaches the live content at a third time, and wherein the one or more sections are omitted when the stored content is output at the accelerated rate; and
outputting the live content at a normal rate after the third time.

2. The method of claim 1, further comprising:
selecting one-or-more frames from a video portion of the AV data received after the first time and before the third time based upon one or more of:
relative maxima of motion activity in comparison to a range of antecedent and succedent video frames,
motion activity exceeding a first threshold,
relative maxima of color histogram changes in comparison to a range of antecedent and succedent video frames,
color histogram changes exceeding a second threshold,
appearance of a new object, and
a failure to detect a previously detected object; and sequentially outputting each of the one-or-more selected frames as a still image or video clip via the display while the stored content is output at the accelerated rate,
wherein the stored content outputted at the accelerated rate comprises one or more of an audio portion of the AV data or text related to the audio portion of the AV data.

3. The method of claim 1, wherein determining that the participant's face is oriented in the direction toward the display comprises:
   determining a position of the display relative to the camera;
   identifying features of the participant's face including at least one of a participant's eye, eyes, nose, mouth, ear, or ears;
   determining a position of the identified features relative to the detected face; and
   determining an alignment of the identified feature in comparison to the position of the display.

4. A computing system, comprising:
   at least one processor;
   a data buffer; and
   at least one memory device including instructions operable to be executed by the at least one processor to perform a set of actions, configuring the at least one processor to:
      receive audio-visual (AV) data;
      output live content from the AV data at a first rate;
      detect, at a first time, a negative paying attention signature based upon processing of captured sensor data;
      determine, at a second time, a positive paying attention signature based upon processing of subsequent captured sensor data, wherein the second time is after the first time;
      store content after the first time;
      output the stored content after the second time, the stored content being output at an accelerated rate until the stored content coincides with the live content at a third time, wherein the third time is after the second time;
      perform speech processing on an audio portion of the AV data; and
      determine an adjusted accelerated rate based on the speech processing to maintain a consistent rate of output of the audio portion in terms of words-per-unit-of-time or phonemes-per-unit-of-time.

5. The computing system of claim 4, wherein the instructions further configure the at least one processor to:
   output live content at the first rate after the third time.

6. The computing system of claim 4, wherein the instructions further configure the at least one processor to:
   detect a head using one or more cameras, the one or more cameras capturing the captured sensor data; and
   determine an orientation of the head relative to a display used to output the content at the first rate,
   wherein a state of the paying attention signature is based upon the direction of eyes on the head relative to the display.

7. The computing system of claim 4, wherein the instructions further configure the at least one processor to:
   monitor a user interface for input, the user interface capturing the captured sensor data,
   wherein receiving input from the user interface corresponds to a positive paying attention signature.

8. The computing system of claim 4, wherein the instructions further configure the at least one processor to:
   pause output of live video content between the first time and the second time; and
   output live audio content between the first time and the second time.

9. The computing system of claim 4, wherein the instructions further configure the at least one processor to:
   select one-or-more video frames received after the first time and before the third time based upon one or more of:
      relative maxima of motion activity in comparison to a range of antecedent and succedent video frames,
      motion activity exceeding a first threshold,
      relative maxima of color histogram changes in comparison to a range of antecedent and succedent video frames,
      color histogram changes exceeding a second threshold,
      appearance of a new object, and
      a failure to detect a previously detected object; and
   sequentially output each of the one-or-more selected frames as a still image or video clip via a display while the stored content is output at the accelerated rate,
   wherein the stored content outputted at the accelerated rate comprises one or more of an audio portion of the AV data or text related to the audio portion of the AV data.

10. The computing system of claim 4, wherein the stored content that is output at the accelerated rate includes an audio portion of the AV data, the instructions further configuring the at least one processor to:
   identify superfluous parts of the audio portion of the AV data based on the speech processing, the superfluous parts comprising one or more of: silences, pauses, spoken filler words, and non-lexical utterances; and
   omit the identified superfluous parts of the audio portion of the AV data from the stored content that is output at the accelerated rate.

11. The computing system of claim 4, wherein the instructions further configure the at least one processor to:
   receive input indicating to change the accelerated rate, including input from a first user interface to increase the accelerated rate and input from a second user interface to decrease the accelerated rate.

12. A non-transitory computer-readable storage medium storing processor-executable instructions for controlling a computing device, comprising program code to configure the computing device to:
   receive audio-visual (AV) data;
   output live content from the AV data at a first rate;
   detect, at a first time, a negative paying attention signature based upon processing of captured sensor data;
   determine, at a second time, a positive paying attention signature based upon processing of subsequent captured sensor data, wherein the second time is after the first time;
   store content after the first time;
   output the stored content after the second time, the stored content being output at an accelerated rate until the stored content coincides with the live content at a third time, wherein the third time is after the second time
   select one-or-more video frames received after the first time and before the third time based upon one or more of:
      relative maxima of motion activity in comparison to a range of antecedent and succedent video frames, motion activity exceeding a first threshold,
relative maxima of color histogram changes in comparison to a range of antecedent and succedent video frames,
color histogram changes exceeding a second threshold,
appearance of a new object, and
a failure to detect a previously detected object; and
sequentially output each of the one-or-more selected frames as a still image or video clip via a display while the stored content is output at the accelerated rate,
wherein the stored content outputted at the accelerated rate comprises one or more of an audio portion of the AV data or text related to the audio portion of the AV data.

13. The non-transitory computer-readable storage medium of claim 12, wherein the program code further configures the computing device to:
output live content at the first rate after the third time.

14. The non-transitory computer-readable storage medium of claim 12, wherein the program code further configures the computing device to:
detect a head using one or more cameras, the one or more cameras capturing the captured sensor data; and
determine an orientation of the head relative to a display used to output the content at the first rate,
wherein a state of the paying attention signature is based upon the direction of eyes on of the head relative to the display.

15. The non-transitory computer-readable storage medium of claim 12, wherein the program code further configures the computing device to:
monitor a user interfaces for input, the user interface capturing the captured sensor data,
wherein receiving input from the user interface corresponds to a positive paying attention signature.

16. The non-transitory computer-readable storage medium of claim 12, wherein the stored content that is output at the accelerated rate includes an audio portion of the AV data, and wherein the program code further configures the computing device to:
perform speech processing on the audio portion of the AV data;
identify superfluous parts of the audio portion of the AV data based on the speech processing, the superfluous parts comprising one or more of: silences, pauses, spoken filler words, and non-lexical utterances; and
omit the identified superfluous parts of the audio portion of the AV data from the stored content that is output at the accelerated rate.

17. The non-transitory computer-readable storage medium of claim 12, wherein the program code further configures the computing device to:
perform speech processing on an audio portion of the AV data; and
adaptively adjust the accelerated rate based on the speech processing to maintain a consistent rate of output of the audio portion in terms of words-per-unit-of-time or phonemes-per-unit-of-time.

18. The non-transitory computer-readable storage medium of claim 12, wherein the program code further configures the computing device to:
receive input indicating to change the accelerated rate, including input from a first user interface to increase the accelerated rate and input from a second user interface to decrease the accelerated rate.

* * * * *